United States Patent [19]

Gunn

[11] Patent Number: 4,538,823
[45] Date of Patent: Sep. 3, 1985

[54] MEANS FOR MOUNTING CHUCK LEVER PINS IN A FULCRUM DEVICE

[76] Inventor: Robert C. Gunn, 222 Longhill Ave., Somerset, Mass. 02726

[21] Appl. No.: 621,849

[22] Filed: Jun. 18, 1984

[51] Int. Cl.³ .............................................. B23B 5/22
[52] U.S. Cl. .................................... 279/37; 279/107
[58] Field of Search .................................. 279/35–40, 279/106, 107; 411/500

[56] References Cited

U.S. PATENT DOCUMENTS 3,915,464 10/1975 Berry .................................. 279/37

Primary Examiner—Frank T. Yost
Attorney, Agent, or Firm—Robert J. Doherty

[57] ABSTRACT

An assembly for use in conjunction with a fulcrum device of an automatic screw machine wherein the cylindrical housing thereof includes a pair of longitudinal recesses disposed on opposite surfaces thereof. The recesses include threaded counterbored openings for receipt of set screws such that the ends of pins supporting a pair of chuck levers may be contacted thereby when the set screws are upwardly moved. The pins are symmetrical and include an end extension which is adapted to contact the upper surface of the set screws and in this fashion secure the pins at both ends thereof so as to insure their fixed position within the housing. In addition, one of the counterbores is of a shallower extent than the other so that such counterbore, in effect, forms a stop end wherein the screw head mounted therein always contacts at least a portion of the pin. In addition, the pin may be positioned end for end so as to, in effect, double the wear life thereof.

5 Claims, 6 Drawing Figures

MEANS FOR MOUNTING CHUCK LEVER PINS IN A FULCRUM DEVICE

BACKGROUND AND OBJECTS OF THE INVENTION

This invention relates to fulcrum devices as used in automatic screw machines and more particularly to an improved means for pivotally mounting the opposed chuck levers of such fulcrum devices. Such fulcrum devices have a pair of pivotal chuck levers which control a collet chuck for engaging lengths of rod or pipe as they are fed into an automatic screw machine.

Automatic screw machines which are well known in the prior patented art have a hollow work spindle into which is fed metal bar stock or pipe so that symmetrically shaped parts can be cut as the spindle is rotated. Thus, parts such as screws, valve bodies, studs, and set screws can be turned at the output of a collet chuck. The fulcrum device is secured within the spindle of the automatic screw machine so that it will rotate and actuate the opening and closing of the collet chuck. The fulcrum device includes two chuck levers which are pivotally mounted in the fulcrum. The ends of the chuck levers are tapered so that a chuck lever sleeve which slides over the fulcrum can engage the tapered ends of the levers forcing the tapered ends of the levers to pivot toward the axis of the spindle. At the other end of each lever is a shoulder which engages a chuch lever extension which moves longitudinally a small increment in distance along the length of the spindle to engage the tapered ends of the collet so that the jaws of the collet chuck will close and clamp the workpiece.

After the workpiece is turned and cut off, a feed tube within the spindle retracts and advances the workpiece a predetermined length before the jaws of the collet chuck are closed to grip the workpiece. The collet chuck serves not only to grip the workpiece but to turn it while various tools are used to shape or form the metal on the machine.

Conventional fulcrum devices use chuck lever pins which are tapered and frictionally engage within the fulcrum device. The lever pins eventually wear so that the fulcrum has to be removed from the machine in order to drive out the tapered pins so that replacement pins can be inserted. These conventional fulcrum devices using tapered pins have been found to be difficult to maintain since the tapered pins are hard to install since the tapered hole must be hand reamed to fit the tapered pin. Upon removal, the tapered pin cannot be reused.

A device which substantially corrects these prior art shortcomings and which is currently in use in the industry is described in U.S. Pat. No. 3,915,464 to Berry issued Oct. 28, 1975. Notwithstanding the presence of such above-referred to device, there remains a need for a more positive clamping action on both ends of the Berry pin so as to insure that the pin is stationary vis-a-vis the chuck lever on which it is pivoted so as to reduce wear. It would furthermore be desirable to modify the configuration of the above referred to pin such that it is simpler, less complex to machine, and, accordingly, less costly. It would also be desirable to form such a pin of symmetrical configuration such that it may be reused in an alternate position so as to increase the wear characteristics thereof.

The present invention, accordingly, provides an assembly which accomplishes these above objectives and thus constitutes an improvement over the aforementioned fulcrum device described in the Berry patent. These and other objectives of the present invention are provided by an assembly for mounting a pivotable member such as a chuck lever from a housing such as the head of a fulcrum holder, said head including trunnion means in turn having a laterally extending bore passing therethrough for receipt of a symmetrical cylindrically shaped pivot pin in turn having a smaller diameter axial extension projecting from each end surface thereof, said housing including laterally open surfaces adjacent opposite sides of said trunnion means, said open surfaces each having an initially counterbored inwardly extending threaded bore for receipt of a headed screw, said screw heads adapted to contact said pin extensions when said screws are upwardly moved thereby positively positioning said pivot pin in said trunnion means.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
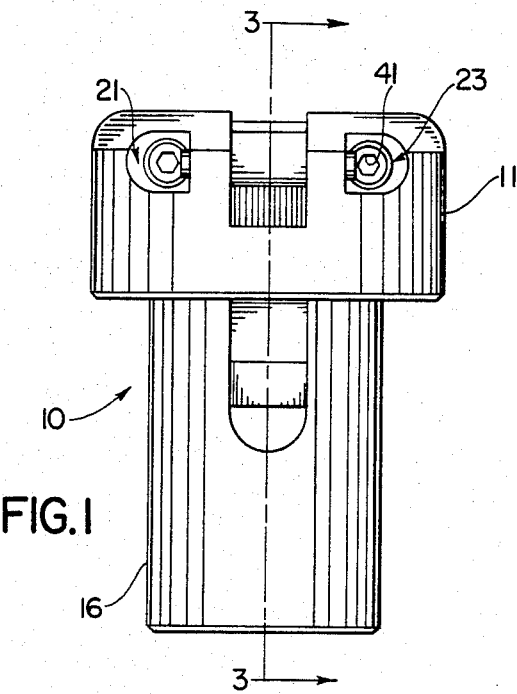
FIG. 1 is a front elevational view of a fulcrum device showing the pin holding assembly.
Figure 2:
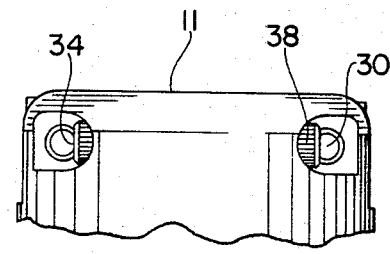
FIG. 2 is a partial side elevational view of the fulcrum device again illustrating the manner in which the pin assembly functions to securely fasten the pin within the enlarged cylindrical housing of the device.
Figure 3:
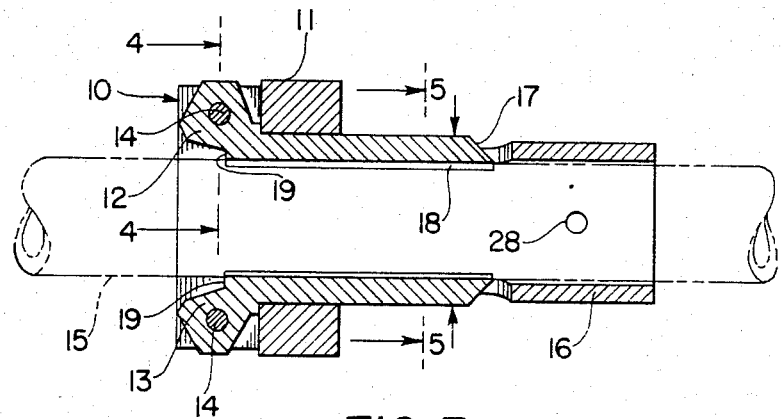
FIG. 3 is a cross-sectional view of the fulcrum device shown surrounding a tubular workpiece as viewed along the section line 3—3 of FIG. 1.
Figure 4:
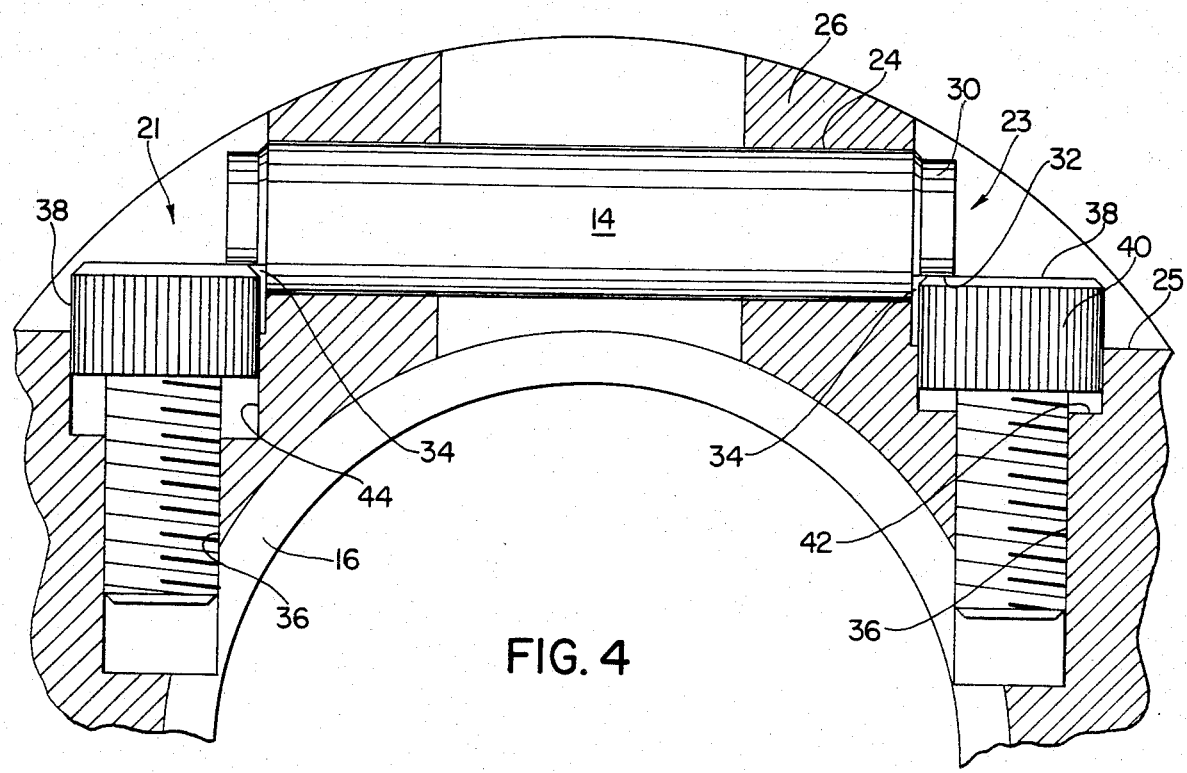
FIG. 4 is an enlarged partial cross-sectional view taken through section line 4—4 of FIG. 3.
Figure 5:
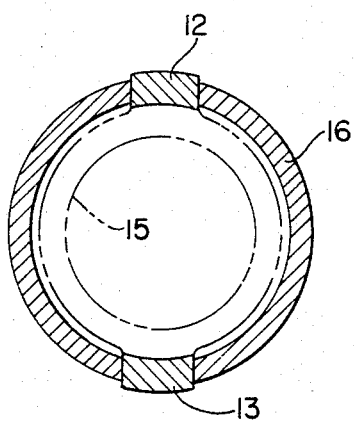
FIG. 5 is a cross-sectional view taken through the section line 5—5 of FIG. 3.

Referring to the drawings there is shown a fulcrum 10 having an enlarged cylindrical portion or head 11 at one end and an extending cylindrical portion 16 integrally formed therewith. Both portions include a hollow bore so that a workpiece such as a pipe or bar stock 15 can pass through the fulcrum when it is mounted in the spindle of an automatic screw machine. The fulcrum includes a pair of opposed chuck levers 12 ad 13 which pivot on chuck lever pins 14. The pins in turn are retained in longitudinal recesses 21, 23 in the main body of the fulcrum.

In operation, fulcrum 10 is inserted into an automatic screw machine so that a chuck collet sleeve (not shown) slides over cylindrical end portions 16 to engage incline/surfaces 17. This causes chuck lever 12 to pivot clockwise and chuck lever 13 to pivot counter-clockwise as the sleeve engages tapered portions 17. At the other end of each lever is a shoulder 19 which engages a chuck lever extension (not shown) so that as the chuck levers pivot, the extension is urged along the axis of the spindle a small increment in distance so as to engage the tapered ends of the collect chuck. The jaws of the collet chuck will thus close and clamp the workpiece.

The pins 14 are cylindrically shaped rather than being tapered as in conventional fulcrums and symmetrical rather than including a different structure at opposed ends as in the aforementioned Berry device. Accordingly and as will be hereinafter more fully explained, the pins are reversible, that is, they may be inserted into the hollow bores 24 of the trunnion portions 26 end for end so when wear occurs on a pin, it may be reversed nd reinserted the opposite way so as to, in effect, double the life of each pin. In addition, each pin terminates in a centrally disposed axial extension 30 which is cylindrically shaped. One side of the extension 30 is provided with a chordal cut so as to form a flat 32. A shoulder 34 which is a portion of the end wall of the pin is positioned adjacent the flat 32.

Both of the recesses 21, 23 of each side of the head 11 include a counterbored threaded bore 36 for receipt of a set screw 38 having an enlarged head 40 which is provided with an Allen head screw opening 41 therein. Although both bores 36 are adapted to receive identically sized set screws 38, the counterbore 42 of the recess 23 is shallower in depth such that at the lower limit of the screw 38 its head 40 will project above the floor 25 of the recess 23 so as to insure that the pin shoulder 34 will contact the side of the enlarged screw head 40 and thus form a stop for the lever pin 14. The other recess 21 is provided with a counterbore 44 of greater depth so that the enlarged head 40 of the screw may be downwardly turned such that its upper head surface is entirely within the counterbore 44 such that the pin may be easily removed from this side. In effect then the recess 21 forms a loading side for the pin 14 while the recess 23 forms a stop side therefore. There are, of course, two such recesses 21 and two such recesses 23 in each head 11.

In loading the pins 14, they are thus inserted through the loading side of the housing, i.e., from recess 21 towards recess 23, through the bore of the appropriate chuck lever with the flats 32 oriented towards the floor 25 of the recesses until the shoulder 34 contacts the side screw head 40. Thereafter by using an Allen head wrench both the screws 38 are upwardly rotated so as to firmly engage the flats 32 of the pin 14 and thus positively secure the pin from rotation at both ends thereof. This feature insures that the pin does not rotate and remains stationary vis-a-vis the housing and the lever arm which is pivotally suspended therefrom. This feature reduces wear on the pins as well as on the trunnion portions 26 of the head 11. In addition, each pin can be inserted end for end as previously brought out so that when wear does occur on one side, the pin can merely be reinserted the opposite way so as to, in effect, double the life of the pin.

Figure 6:
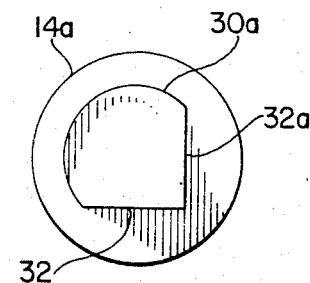
FIG. 6 is an end view of an alternate pin construction.

Another feature which can be included so as to increase pin wear life even more is shown in FIG. 6. Therein a second flat 32a is formed on the extensions 30a at right angles to the flat 32. In this way, the pin 14a could be removed, rotated 90 to position flat 32a downwardly and thereafter reinserted into bore 24 to provide added wear surfaces.

It is also important should one in reassembling a pin forget to wind up the stop end screw 38 then the relative height of the counterbore 42 thereof insures that there will be contact between the pin shoulder 34 and the head 40 so that the pin cannot work loose from that end. It is more likely that one inserting the pin would not forget to screw up the insert or loading side screw; and, accordingly, this additional feature provides for an added measure of safety.

It is also desirable that the load recesses 21 be disposed at opposed diagonal corners from each other on the housing head such that a mechanic or machine operator can load both pins from one side, that is, the rotational side facing the work station position, such that the operator would not have to go in back of the machine in order to replace the pin.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. As assembly for mounting a pivotable member such as a chuck lever from a housing such as the head of a fulcrum holder, said head including trunnion means in turn having a laterally extending bore passing therethrough for receipt of a symmetrical cylindrically shaped pivot pin in turn having a smaller diameter axial extension projecting from each end surface thereof, said housing including laterally open surfaces adjacent opposite sides of said trunnion means, said open surfaces each having an initially counterbored inwardly extending threaded bore for receipt of a headed screw, said screw heads adapted to contact said pin extensions when said screws are upwardly moved thereby positively positioning said pivot pin in said trunnion means.

2. The assembly of claim 1, the counterbore of the threaded bore on one side of the trunnion means of a depth such that the screw head positioned therein projects above its respective open surface so as to abut a shoulder formed by the pin end surface when said screw is in its lowermost position thereby forming a stop for the pin.

3. The assembly of claim 1, the counterbore of the other of said threaded bores being of a greater depth than said one counterbore and of an extent such that the screw head positioned therein extends below its respective open surface in its lowermost position thereby enabling the pin to be loaded and/or removed from the other side of said trunnion means.

4. The assembly of claim 1, each said pin extension having a flat against which said screws are adapted to contact.

5. The assembly of claim 4, each said pin extension having two adjacent flats.

* * * * *